(12) United States Patent
Foreman

(10) Patent No.: US 10,549,330 B2
(45) Date of Patent: Feb. 4, 2020

(54) LIVE PILOT SENSING APPARATUS

(71) Applicant: GM GLOBAL TECHNOLOGY OPERATIONS LLC, Detroit, MI (US)

(72) Inventor: Thomas M. Foreman, Parma, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 737 days.

(21) Appl. No.: 15/286,790

(22) Filed: Oct. 6, 2016

(65) Prior Publication Data

US 2018/0099322 A1    Apr. 12, 2018

(51) Int. Cl.
  *B21C 51/00* (2006.01)
  *B21D 22/02* (2006.01)
  *B21D 55/00* (2006.01)
  *G01D 5/12* (2006.01)

(52) U.S. Cl.
  CPC .............. *B21C 51/00* (2013.01); *B21D 22/02* (2013.01); *B21D 55/00* (2013.01); *G01D 5/12* (2013.01)

(58) Field of Classification Search
  CPC .... B21C 51/00; B21D 43/025; B21D 43/021; B21D 55/00; G01D 5/02
  See application file for complete search history.

(56) References Cited

U.S. PATENT DOCUMENTS 3,765,283 A * 10/1973 Murphy, II .......... B21D 43/025
                                                            83/61
4,174,663 A * 11/1979 Williams .............. B30B 15/287
                                                          100/344

* cited by examiner

*Primary Examiner* — Teresa M Ekiert

(57) ABSTRACT

A live pilot sensing apparatus is presented herein. The apparatus includes a pneumatic cylinder, sensing plate, and at least one stabilizing plate. The cylinder includes a piston and is configured to connect to the die of a stamping system. The sensing plate is configured to connect with the distal end of the piston. The stabilizing plate is configured to connect with an exposed segment along the cylinder piston, between the sensing plate and cylinder. Moreover, the piston is configured to react upon substantial contact between the sensing plate and a portion of a foreign object within the stamping system.

17 Claims, 5 Drawing Sheets

US 10,549,330 B2

LIVE PILOT SENSING APPARATUS

INTRODUCTION

Stamping systems in metalworking often encompass punching, coining, and bending a strip of metallic stock. To accomplish this effort, a steel strip is fed through a reciprocating stamping press. As the press moves up, a top die moves with it, which allows the material to feed into the stamping press. When the press moves down, the top and bottom dies come together and perform the stamping operation upon the metal strip. Thus, with each stroke of the press, a part can be formed, completed, and then removed from the system.

As it is fed through the stamping press, metallic stock has been known to accidentally move away from its intended feed path. Such movement may allow for improper stamping of the metal strip, which can lead to inefficient use of the stamping press, uneconomical amounts of the metal strip being processed, or inexact parts being manufactured. A sensing apparatus is therefore desired to sense when the metal strip feed is off the intended feed path as well as help in stopping improper stamping.

SUMMARY

A live pilot apparatus is presented herein. The apparatus includes a pneumatic cylinder, sensing plate, and at least one stabilizing plate. The cylinder includes a piston and is configured to connect to the die of a stamping system. The sensing plate is configured to connect with the distal end of the piston. The stabilizing plate is configured to connect with an exposed segment along the cylinder piston, between the sensing plate and cylinder. In this embodiment, the piston is configured to react upon substantial contact between the sensing plate and a portion of a foreign object within the stamping system.

The live pilot sensing apparatus may further include an additional stabilizing plate which is configured to connect with an exposed additional segment along the cylinder piston, also between the sensing plate and the other stabilizing plate. The live pilot sensing apparatus may further include at least one guide post which is configured to enhance stability of the sensing plate and is configured to extend from the sensing plate and through the stabilizing plate. The cylinder may further include a position sensor which is configured to connect with the operational control system of the stamping system, the position sensor may also be configured to send an operation signal upon substantial piston reaction. The position sensor may further include a switch, wherein the position sensor sends the operation signal upon a material piston movement as monitored by the switch. The sensing plate may include a plurality of orifices configured to facilitate the sensitivity of the live pilot. The stabilizing plate may include a plurality of orifices to reduce the weight of the live pilot apparatus. The cylinder may be of a double-acting-cylinder configuration. The live pilot apparatus may be configured to connect with the bottom die of the stamping system. The foreign object within the stamping system may be a metal strip having an operative movement through the stamping system.

A method of sensing an anomalous position of at least a portion of a metal strip having an operative movement through a stamping system is also presented herein. The method includes the steps of: (a) providing a die of the stamping system; (b) providing an exemplary embodiment of the live pilot sensing apparatus presented herein; (c) allowing the exemplary live pilot apparatus to be at a position for the piston to react when substantial contact is made between the sensing plate and the portion of the metal strip; (d) operatively moving a metal strip through the stamping system; (e) allowing the top die to be lowered to perform the stamping operation on the portion of the metal strip; (f) determining if the piston has reacted through the substantial contact between the sensing plate and metal strip; and (g) based on step (f), stopping operation of the stamping system prior to a material connection between the top die and metal strip.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
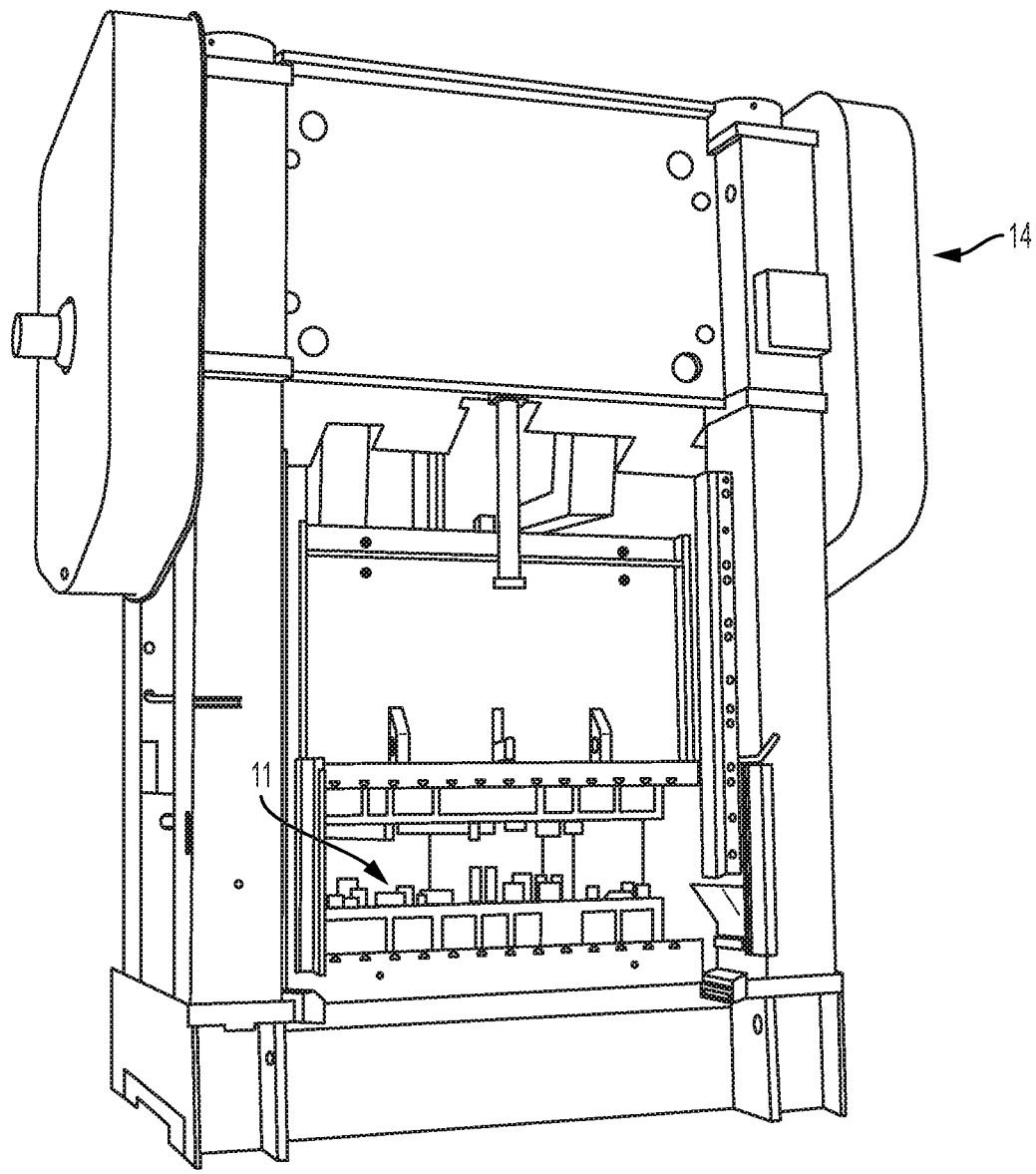
FIG. 1 shows an environment in which an exemplary live pilot sensing apparatus may be implemented.
Figure 2A:
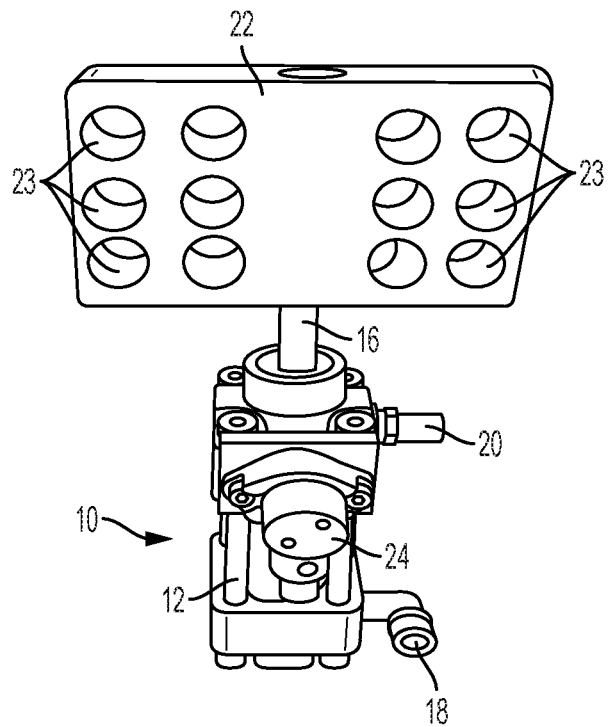
FIG. 2A shows a perspective view of certain aspects of an exemplary live pilot apparatus.
Figure 2B:
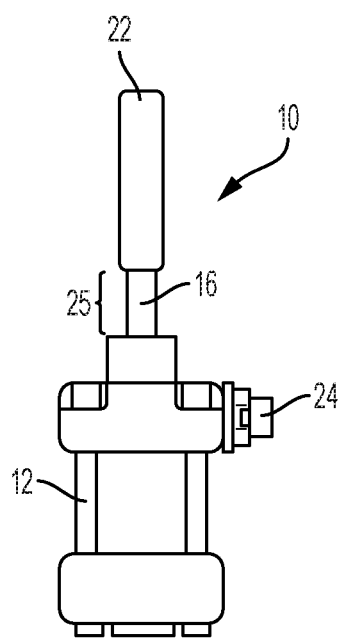
FIG. 2B shows a side view of the exemplary apparatus of FIG. 2A.
Figure 3:
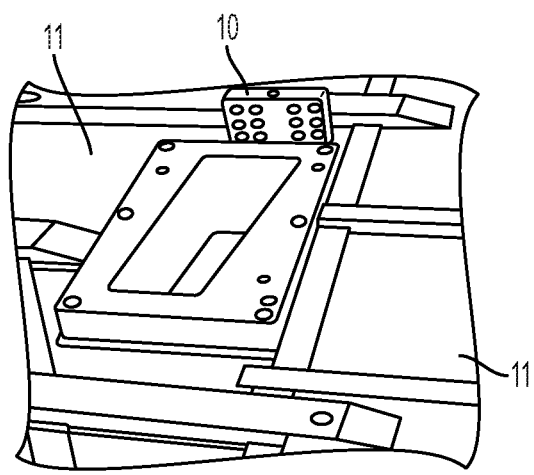
FIG. 3 shows another aspect of the environment in which the exemplary apparatus of FIG. 2A may be implemented.
Figure 4:
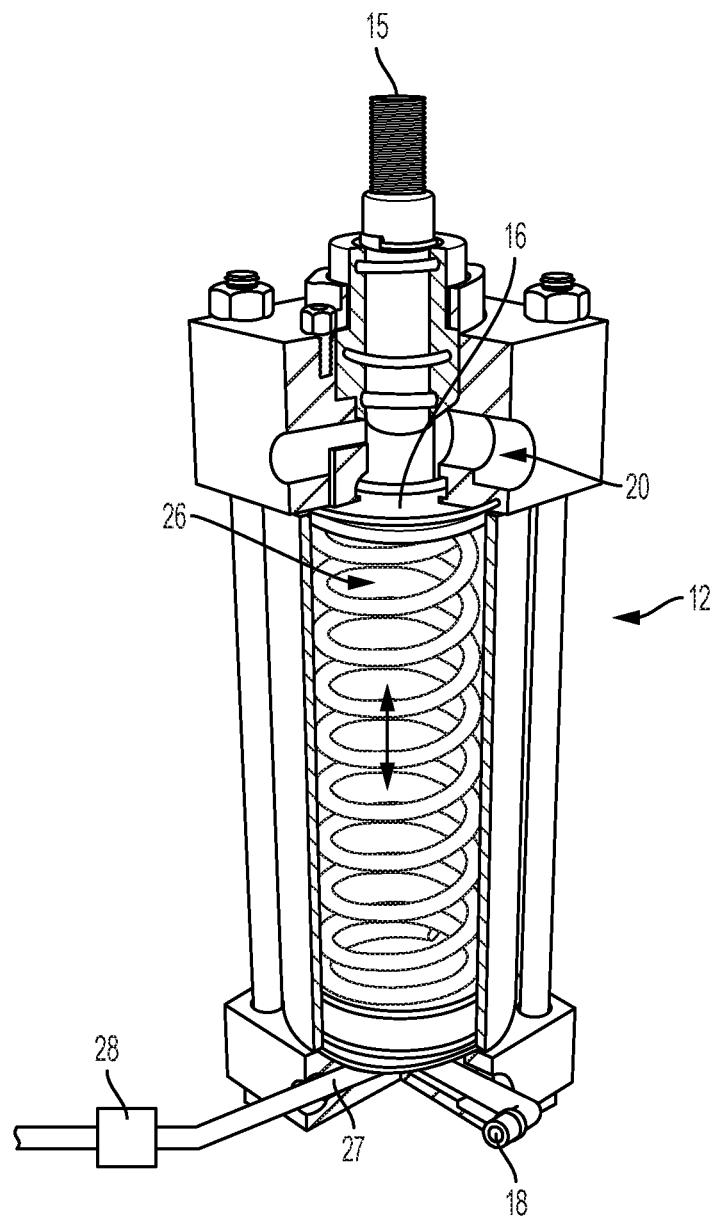
FIG. 4 shows a perspective view of an exemplary cylinder that may be implemented in an exemplary live pilot apparatus.

FIGS. 1-4 show aspects of an exemplary live pilot sensing apparatus 10 that may be fastened to the bolster connected, bottom half of die 11 (bottom die) of a stamping press 14 (e.g., through a number of rivets). Live pilot 10 includes the prominent features of a pneumatic cylinder 12 and sensing plate 22. In this embodiment, a distal end 15 of a piston 16 is situated within cylinder 12 and can be moved in a bidirectional manner by air pressure (providing a double-acting-cylinder configuration). As follows, air is provided into cylinder 12, through an intake valve 18, and chamber pressure builds within an internal chamber 26 to force piston 16 into a default position (FIG. 4). However, as external forces cause piston 16 to move to a non-default position, air escapes through an outtake valve 20 and chamber pressure diminishes within the internal chamber 26. Piston 16 will moreover remain in this non-default position until air is again provided into the chamber 26 of cylinder 12 and the cycle can start over.

Cylinder 12 incorporates a position sensor 22 incorporating an electrical switch 24 which monitors material movement of the piston shaft 16. As such, when the piston 16 is moved to a non-default position (e.g., 1 mm from default), the electrical switch 24 will recognize this movement as being material, and position sensor 27 will send an operation signal to control system 28. As a result, control system 28 may shut off electrical power to stamping system 14. Skilled artisans will appreciated that the implementation and workings of electrical switches 24 to monitor such movement is generally known in the art. Those of skill in the art will moreover recognize that other sensor embodiments, locations, and configurations may be implemented such as, but not limited to, sensors having magnetic elements being located internally within cylinder 12.

Joined to the exposed, distal end of piston 15 is a vertically-oriented sensing plate 22. Sensing plate 22 has a number of orifices 23 to reduce its mass and ensure less force would be required to act on plate 22 for movement of piston 16. During operation of stamping press 14, when the top die is lowered to stamp the sheet of steel stock, sensing plate 22 will come into contact with any part of the sheet metal that becomes offset of the lift rack (i.e., when the metal strip is not moving in its correct position while the rack is moving to meet with the bottom die). Otherwise, when the sheet metal is on its intended feed path, sensing plate 22 will completely pass one side of the sheet metal, and top die 11 will properly conduct the stamping operations. It should be understood that materials which may construct sensing plate 22 include, but are not limited to, steel, stainless steel, and plastic.

Figure 5:
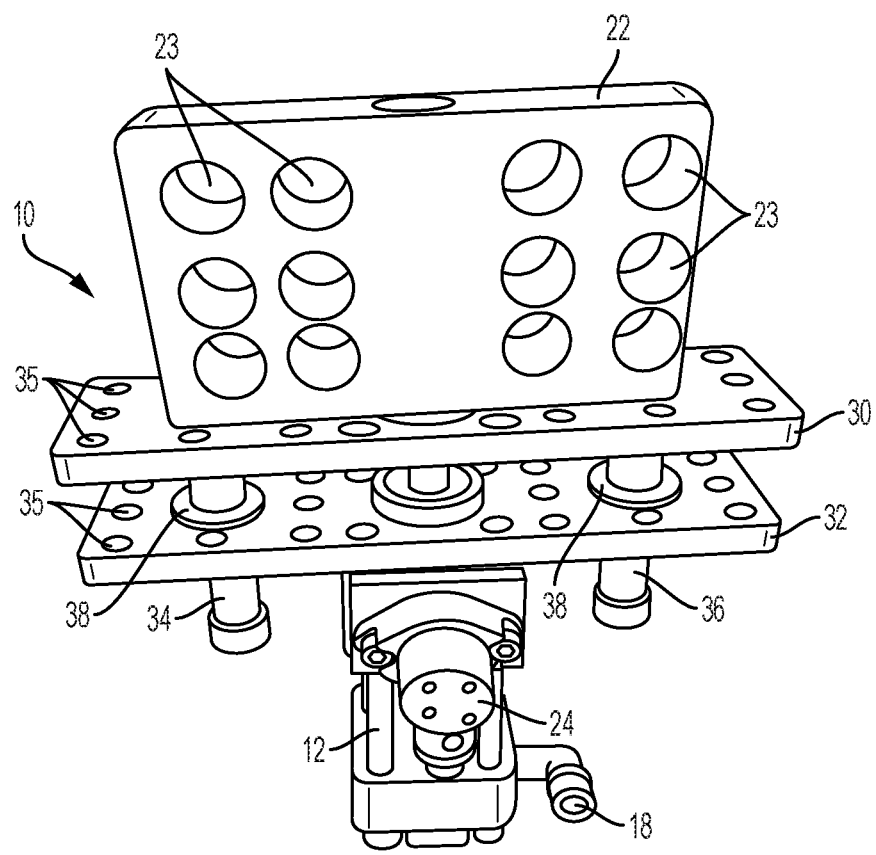
FIG. 5 shows a perspective view of another aspect of an exemplary live pilot apparatus.
Figure 6:
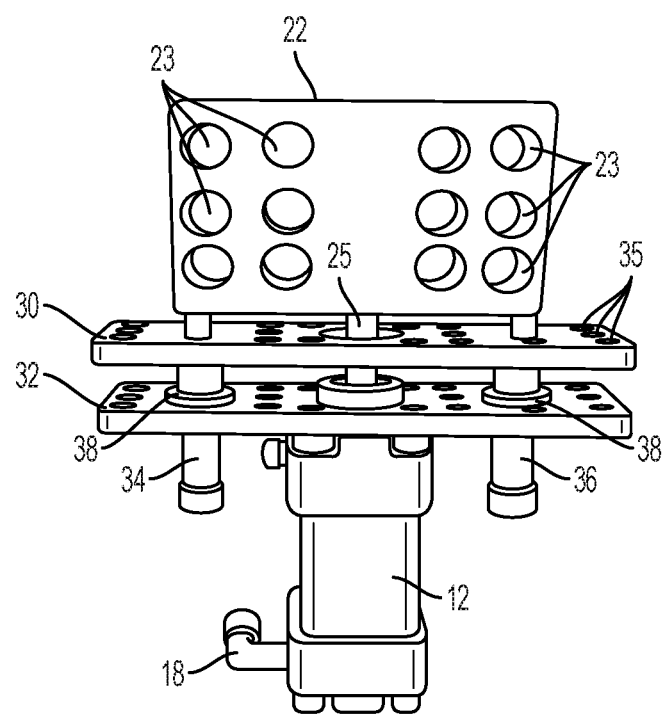
FIG. 6 shows a side view of the exemplary apparatus of FIG. 5.

As can be seen in FIGS. 5 and 6, both a first and second stabilizing plate 30, 32, respectively, are incorporated to stabilize the exposed segment 25 of piston 16, between sensing plate 22 and the chamber outlet of cylinder 12. Each stabilizing plate 30, 32 may moreover have numerous orifices 35, to help reduce plate mass as well as overall weight of live pilot 10. It should be understood that materials which may construct each stabilizing plate 30, 32 include, but are not limited to, steel, stainless steel, and plastic.

Two guide posts 34, 36, are similarly situated on both sides of the distal end of piston 16, respectively. Each guide post 34, 36 moreover extends peripherally from a point near one side of sensing plate 22 and extends through both the first and second stabilizing plates 30, 32. Each stabilizing plate 30, 32 has an opening with an adapter ring 38 having an inner circumference slightly larger than the circumference of the corresponding guide post 34, 36. As such, this configuration allows for a minimal amount of lateral movement of the guide posts 34, 36, when properly installed onto live sensor 10. The stabilizing plates 30, 32 and corresponding guide posts 34, 36, respectively, collaborate to establish adequate stability of the exposed segment 25 of piston 12.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A live pilot sensing apparatus, the live pilot sensing apparatus comprising:
   a pneumatic cylinder comprising a piston, the pneumatic cylinder configured to connect to a bottom die of a stamping system;
   a sensing plate configured to connect with a distal end of the piston;
   a first stabilizing plate configured to connect with a first location along the piston, the first location being between the sensing plate and the pneumatic cylinder;
   a second stabilizing plate configured to connect with a second location along the piston, the second location being between the sensing plate and the first stabilizing plate; and
   wherein the piston is configured to react upon contact between the sensing plate and a portion of a foreign object within the stamping system.

2. The live pilot sensing apparatus of claim 1, further comprising at least one guide post configured to enhance stability of the sensing plate, the at least one guide post further configured to extend from the sensing plate and through the first stabilizing plate.

3. The live pilot sensing apparatus of claim 1, wherein the pneumatic cylinder is further comprising a position sensor configured to connect with an operational control system of the stamping system, the position sensor further configured to send an operation signal upon a piston reaction.

4. The live pilot sensing apparatus of claim 3, wherein the position sensor is further comprising a switch, wherein the position sensor sends the operation signal upon a material piston movement as monitored by the switch.

5. The live pilot sensing apparatus of claim 1, wherein the sensing plate comprises a plurality of orifices configured to facilitate a sensitivity of the live pilot sensing apparatus.

6. The live pilot sensing apparatus of claim 1, wherein the first stabilizing plate comprises a plurality of orifices configured to reduce weight of the live pilot sensing apparatus.

7. The live pilot sensing apparatus of claim 1, wherein the pneumatic cylinder comprises a double-acting cylinder configuration.

8. The live pilot sensing apparatus of claim 1, wherein the foreign object within the stamping system is a metallic strip having an operative movement through the stamping system.

9. A live pilot sensing apparatus configured to be connected to a bottom die of a stamping system, the live pilot sensing apparatus comprises:
   a pneumatic cylinder having a double-acting cylinder configuration, the pneumatic cylinder comprising a piston and a position sensor, the pneumatic cylinder configured to connect to the bottom die;

the position sensor comprising a switch, wherein the position sensor sends an operation signal upon a material piston movement as monitored by the switch;

a vertically-oriented sensing plate configured to connect with a distal end of the piston;

horizontally-oriented first and second stabilizing plates configured to connect with respective locations along the piston between the vertically-oriented sensing plate and cylinder;

a plurality of guide posts configured to enhance the stability of the vertically-oriented sensing plate, each of the plurality of guide posts is further configured to extend peripherally from the vertically-oriented sensing plate and through each of the first and second stabilizing plates; and wherein the piston is configured to react upon contact being made upon the vertically-oriented sensing plate being lowered onto a portion of a metallic strip having an operative movement through the stamping system.

10. The live pilot sensing apparatus of claim 9, wherein the vertically-oriented sensing plate comprising a plurality of orifices configured to facilitate a sensitivity of the live pilot sensing apparatus.

11. The live pilot sensing apparatus of claim 9, wherein the first and second stabilizing plates each comprise a plurality of orifices configured to reduce live pilot apparatus weight.

12. A method of sensing an anomalous position of at least a portion of a metallic strip having an operative movement through a stamping system, the method comprising:

(a) providing a bottom die of the stamping system;

(b) providing a live pilot sensing apparatus, the apparatus comprising:

a pneumatic cylinder comprising a piston, the pneumatic cylinder configured to connect to the bottom die;

a sensing plate configured to connect with an exposed segment of the piston;

a first stabilizing plate configured to connect with a first location along the piston, the first location being between the sensing plate and the pneumatic cylinder;

a second stabilizing plate configured to connect with a second location along the piston, the second location being between the sensing plate and the first stabilizing plate; and wherein the piston is configured to react upon contact between the sensing plate and the portion of the metallic strip;

(c) allowing the live pilot sensing apparatus to be at a position for the piston to react when contact is made between the sensing plate and the portion of the metallic strip;

(d) operatively moving the metallic strip through the stamping system;

(e) allowing a top die of the stamping system to be lowered to perform a stamping operation on the portion of the metallic strip;

(f) determining if the piston has reacted through the contact between the sensing plate and the metallic strip; and (g) based on (f), stopping operation of the stamping system prior to a material connection between the top die and the metallic strip.

13. The method of claim 12, wherein the live pilot sensing apparatus is further comprising at least one guide post configured to enhance stability of the sensing plate, the at least one guide post further configured to extend from the sensing plate and through the first stabilizing plate.

14. The method of claim 12, wherein:

the pneumatic cylinder is further comprising a position sensor configured to connect with an operational control system of the stamping system;

the position sensor further configured to send an operation signal upon the piston being moved to a non-default position; and step (g) further comprising, upon the piston being moved to a non-default position, via the position sensor, sending the operation signal to cause the operational control system to initiate a process of stopping operation of the stamping system.

15. The method of claim 12, wherein the sensing plate comprising a plurality of orifices configured to facilitate a sensitivity of the live pilot sensing apparatus.

16. The method of claim 12, wherein the first stabilizing plate comprising a plurality of orifices configured to reduce apparatus weight.

17. The method of claim 12, wherein the pneumatic cylinder comprises a double-acting cylinder configuration.

* * * * *